Aug. 9, 1932.  W. C. KEYS  1,871,376
MOUNTING BRACKET
Filed Sept. 6, 1928
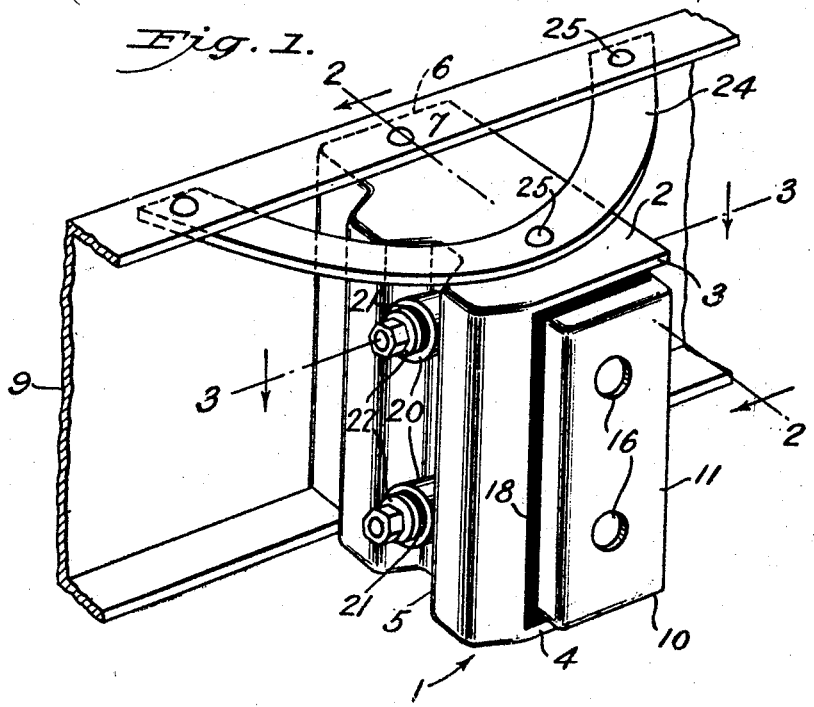
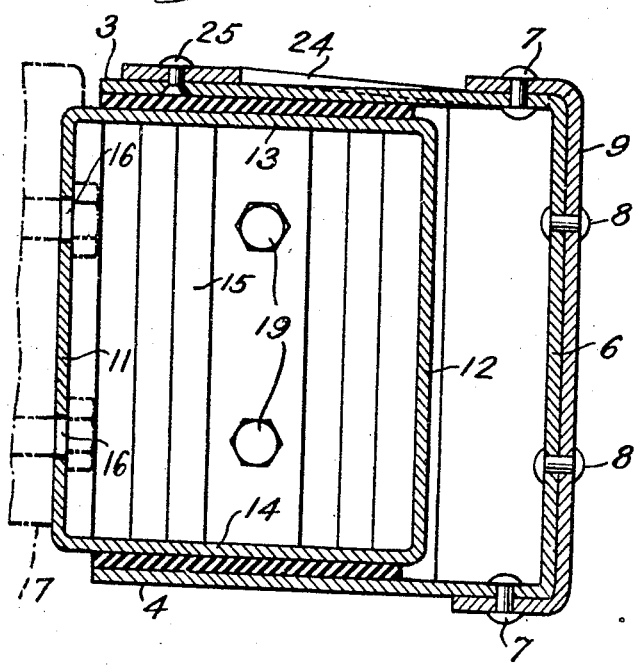
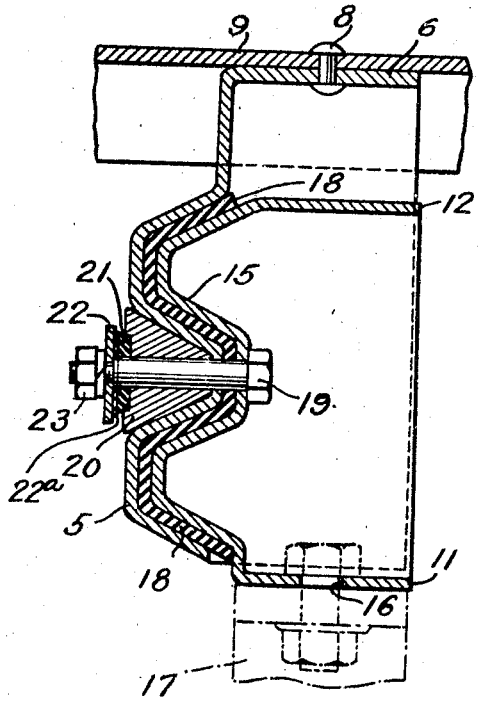
INVENTOR
Walter C. Keys
BY
ATTORNEY Patented Aug. 9, 1932

1,871,376

UNITED STATES PATENT OFFICE

WALTER C. KEYS, OF DETROIT, MICHIGAN, ASSIGNOR TO THE MECHANICAL RUBBER COMPANY, OF CLEVELAND, OHIO, A CORPORATION OF NEW JERSEY

MOUNTING BRACKET

Application filed September 6, 1928. Serial No. 304,349.

This invention relates to an engine mounting, and more particularly to a bracket for supporting an engine in the frame of an automobile.

The problem of supporting an automobile engine is rendered more difficult by the presence of high frequency vibrations resulting from the movement in a vertical plane of the various reciprocating and rotating parts of an engine which high frequency vibrations are transmitted through the metal of the engine to its supporting structure. In addition to these high frequency vibrations there are shocks resulting from the movement of the vehicle carrying the engine over rough roads and from the rapid acceleration of present day cars and the rapid deceleration due to the use of four wheel brakes.

It is an object of this invention to provide a bracket for supporting an engine in a frame which is so constructed and arranged that it will absorb high frequency vibrations transmitted to it from the engine, that will provide means for limiting and dampening the twist of the frame side member, resulting from the application of the engine load in a plane inwardly from the neutral vertical axis of the side member. Other objects will appear in the detailed descriptions which follows:

The device shown herein is but one modification of the inventive idea herein disclosed and broadly claimed, another modification being shown in the application Serial No. 304,450 filed of even date herewith now Patent No. 1,822,529, of Sept. 8, 1931.

A preferred form of the invention herein disclosed is described in the following specification and shown in the accompanying drawing in which:

Fig. 1 is a perspective view of the bracket shown in position upon the frame rail.

Fig. 2 is a section on the line 2—2 of Fig. 1 looking in the direction of the arrows.

Fig. 3 is a section on line 3—3 of Fig. 1 looking in the direction of the arrows.

The bracket is indicated generally at 1 in Fig. 1 and has a supporting sheet metal stamping or member 2 which is formed with top and bottom sides 3 and 4, a corrugated back 5 and an end 6 which is fastened by means of rivets 7 and 8 to the side rail 9 of an automobile or other vehicle frame.

The bracket also has a second sheet metal stamping or member 10 formed with ends 11 and 12, top and bottom 13 and 14, and a corrugated back 15 which is complemental to the corrugated back 5 of the stamping 2. The end 11 has apertures 16 therein which receives bolts to clamp the stamping 10 to the arm 17 of the engine as shown in dotted lines in Figs. 2 and 3.

As shown in Fig. 3, the corrugated backs 5 and 15 are juxtaposed and a sheet of vulcanized rubber composition or other elastic resilient material such as rubberized fabric or a rubber compound having fibrous ingredients is positioned between the backs 5 and 15 and extends, as shown in Figs. 1 and 2, between the tops 3 and 13 of the sheet metal stampings as well as the bottom 4 and 14 thereof.

The stampings 2 and 10 together with the interposed sheet of rubber composition 18 are held together in one unit by the shoulder bolts 19 which extend through apertures in the stampings and the rubber sheet as shown in Fig. 3. A sheet of rubber composition may be fully or locally reinforced with fabric vulcanized within it, and it may be made either by molding it into form or by trimming it out of a flat sheet. A wedge shaped bushing 20 surrounds the shank of the bolt 19 and fits between the corrugations in the back 5. A rubber washer 21, a shim 22a, a metallic washer 22 and the nut 23 fit the end of the bolt 19 and serve to tighten the elements of the bracket together.

A gusset 24 is riveted, as shown at 25, to the top 3 of stamping 2 and to the bottom side of the upper flange of the frame rail as shown in Fig. 1.

As will be obvious from the showing in the drawing and the detailed description given above, the bracket provides a connection between the frame rail and motor which has great strength against twisting or movement parallel to the frame rail due to the rivets 7 and 8 and to the large bearing surface between the end 6 and the frame rail 9 and also due to the support or bracing effect of the gusset 24 which tends to hold the stamping 2 against any twisting about the vertical axis. Furthermore, due to the connection of the stamping 2 on both its top and bottom with the rail 9 and also to the bracing effect of the gusset 24 the bracket offers great resistance to twisting about any horizontal axis. Also the corrugated construction of the backs of the stampings adds strength to the bracket against forces tending to shear the bolts 19. This corrugated construction also provides a large bearing area between the stampings so as to transmit forces in a direction parallel to the frame. Furthermore the corrugated construction of the backs together with the contiguous tops and bottoms of the stampings give the bracket great strength or resistance against twisting of the stampings relative to one another.

The stampings 10 and 12 are held together by the bolt 19 and bushing 20 with a force no greater than necessary to provide against looseness between the brackets, that is the portion of the rubber sheet 18 extending between the corrugated backs is not under compression to any considerable degree, and the terms "substantially unstressed" used in the claims are intended to convey the meaning that the stress on the rubber sheet 18 is not great. Due to the weight of the motor the portion of the sheet of rubber 18 extending between the bottoms and tops of the stampings is under considerable compression. The rubber sheet serves to absorb both the high frequency vibrations and the shocks which are transmitted to the bracket in a manner which is set forth in the following theory which is believed to be correct at present but which has not been proved beyond question and is offered for the purpose of clarifying the invention, and it is not intended to thereby limit the invention to the particular theory set forth since the results set forth herein are obtained regardless of the theory.

The high frequency vibrations are believed to be set up by the rapidly reciprocating and rotating parts of the engine and for that reason are thought to occur in a vertical plane. These vibrations are transmitted from the metal of the engine to the bracket and due to the intimate contact between the metal of the stamping 12 and the horizontal portions of the sheet of rubber between the top and bottoms of the stampings, the vibrations are transmitted to the rubber. However, since the coefficient of elasticity of the rubber is very small compared to that of the metal, the vibrations will not be transmitted from the rubber into the metal of the sheet metal stamping 2 so that the vibrations are absorbed in the rubber under compression. This theory is in accordance with the well known physical law that vibrations are transmitted readily from a dense medium to a rare medium or in other words from a medium of high coefficient of elasticity to one of a low coefficient of elasticity, but not vice versa. Thus it is seen that the portions of the sheet of rubber between the tops and the bottoms of the sheet metal stamping serve in the present device to absorb the high frequency vibrations.

The shocks and twisting motions to which the bracket is subjected are largely in a horizontal plane since such effects flow very largely from the rapid acceleration or deceleration of the vehicle which cause the strains in a horizontal plane due to the great inertia of the engine. Travelling over uneven roads and making sharp curves also tend to set up stresses between the engine and frame in a horizontal plane. These shocks and twisting motions tend to cause a relative movement between the frame and the engine thereby setting up a type of strain which cannot be absorbed as could be done with the high frequency vibrations transmitted through the metal, but the transmission of such strains can be dampened, that is their duration can be so lengthened as to diminish the stresses which flow therefrom. It is for this reason that the portion of the rubber sheet which extends between the corrugated backs of the stampings is very slightly stressed or substantially unstressed in order that the rubber sheet will allow for a slight twisting and sliding movement or "play" between the brackets which tends to dampen shocks and twisting movements. While the above theory is believed to be correct, other theories of the operation of the device may be advanced. However, the results obtained by the device are such as to absorb high frequency vibrations and to dampen shocks and twisting strains.

While a preferred form of the invention has been described in detail herein, it is not intended thereby to limit the invention to such form, but many changes in size and shape of the parts of the device which lie within the scope of the invention will occur to those skilled in the art, and for an understanding of the scope of the invention reference should be made to the claims.

Having thus described my invention, what I claim and desire to protect by Letters Patent is:

1. A bracket for supporting an engine in a frame comprising in combination, a member adapted to be fastened to the frame and having horizontal and vertical faces, a second member adapted to be fastened to the engine and having horizontal and vertical faces complemental to those of the first mentioned member, and a sheet of shock absorbing material between the horizontal and the vertical faces, one of the faces of the first mentioned member being corrugated, the complemental face of the second member being correspondingly corrugated.

2. A bracket for supporting an engine in a frame comprising in combination, a member adapted to be fastened to the frame and having horizontal and vertical faces, a second member adapted to be fastened to the engine and having horizontal and vertical faces complemental to those of the first mentioned member, and a sheet of shock absorbing material between the horizontal and the vertical faces, the complemental vertical faces of the two members being corrugated.

3. A bracket for supporting an engine in a frame comprising in combination, a member adapted to be fastened to the frame and having horizontal and vertical faces, a second member adapted to be fastened to the engine and having horizontal and vertical faces complemental to those of the first mentioned member, and a sheet of shock absorbing material between the horizontal and the vertical faces, the complemental vertical faces of the two members being corrugated, the horizontal sheet of shock absorbing material normally being under compression and the vertical sheet of shock absorbing material normally being substantially unstressed.

4. A bracket for supporting an engine in a frame comprising in combination, a sheet metal stamping adapted to be fastened to the frame and having horizontal and vertical faces, a second sheet metal stamping adapted to be fastened to the engine and having horizontal and vertical faces complemental to those of the first mentioned sheet metal stamping, and a rubber sheet between the horizontal and the vertical faces, the complemental vertical faces of the two sheet metal stampings being corrugated.

5. A bracket for supporting an engine in a frame comprising in combination, a sheet metal stamping adapted to be fastened to the frame and having horizontal and vertical faces, a second sheet metal stamping adapted to be fastened to the engine and having horizontal and vertical faces complemental to those of the first mentioned sheet metal stamping, and a rubber sheet between the horizontal and the vertical faces, the complemental vertical faces of the two sheet metal stampings being corrugated, the horizontal portion of the rubber sheet normally being under compression and the vertical portion of the rubber sheet normally being substantially unstressed.

Signed at Detroit, County of Wayne, State of Michigan, this 30th day of June, 1928.

WALTER C. KEYS.